United States Patent
Sivarajan

(10) Patent No.: US 10,826,078 B2
(45) Date of Patent: Nov. 3, 2020

(54) SOLUTION BASED NANOSTRUCTURED CARBON MATERIALS (NCM) COATINGS ON BIPOLAR PLATES IN FUEL CELLS

(71) Applicant: Ramesh Sivarajan, Shrewsbury, MA (US)

(72) Inventor: Ramesh Sivarajan, Shrewsbury, MA (US)

( * ) Notice: Subject to any disclaimer, the term of this patent is extended or adjusted under 35 U.S.C. 154(b) by 0 days.

(21) Appl. No.: 15/970,332

(22) Filed: May 3, 2018

(65) Prior Publication Data

US 2018/0254494 A1    Sep. 6, 2018

Related U.S. Application Data

(62) Division of application No. 13/322,205, filed as application No. PCT/US2010/037784 on Jun. 8, 2010, now Pat. No. 9,966,611.

(60) Provisional application No. 61/185,491, filed on Jun. 9, 2009.

(51) Int. Cl.
| | |
|---|---|
| *H01M 8/0228* | (2016.01) |
| *B82Y 30/00* | (2011.01) |
| *B82Y 40/00* | (2011.01) |
| *H01M 8/0213* | (2016.01) |
| *C01B 32/15* | (2017.01) |
| *H01M 8/1018* | (2016.01) |

(52) U.S. Cl.
CPC ......... *H01M 8/0228* (2013.01); *B82Y 30/00* (2013.01); *B82Y 40/00* (2013.01); *C01B 32/15* (2017.08); *H01M 8/0213* (2013.01); *H01M 2008/1095* (2013.01); *Y02P 70/56* (2015.11)

(58) Field of Classification Search
CPC ..... B82Y 30/00; B82Y 40/00; C01B 31/0206; H01M 8/0228; H01M 8/0213; H01M 2008/1095; Y02P 70/56; Y02E 60/50
USPC ....................................................... 429/505
See application file for complete search history.

(56) References Cited

U.S. PATENT DOCUMENTS

| | | | |
|---|---|---|---|
| 7,365,100 B2 | 4/2008 | Kuper et al. | |
| 7,491,428 B2 | 2/2009 | Smits et al. | |
| 8,859,165 B2 | 10/2014 | Zhang et al. | |
| 9,296,912 B2 | 3/2016 | Sivarajan et al. | |
| 9,340,697 B2 | 5/2016 | Sivarajan et al. | |
| 2003/0203139 A1 | 10/2003 | Ren et al. | |
| 2005/0064263 A1 | 3/2005 | Goebel et al. | |
| 2005/0238810 A1 | 10/2005 | Scaringe et al. | |
| 2006/0092370 A1 | 5/2006 | Lu | |
| 2007/0158584 A1* | 7/2007 | Lin ..................... | H01L 23/3677 250/441.11 |
| 2007/0238006 A1 | 10/2007 | Vyas et al. | |

(Continued)

FOREIGN PATENT DOCUMENTS

| | | |
|---|---|---|
| JP | 2002255528 A | 9/2002 |
| JP | 2003238126 A | 8/2003 |

(Continued)

*Primary Examiner* — Gary D Harris
(74) *Attorney, Agent, or Firm* — Wilmer Cutler Pickering Hale and Dorr LLP

(57) ABSTRACT

A bipolar plate for fuel cells includes a flow plate having a first surface for the introduction of hydrogen fuel gas and water vapor and a second surface for the introduction of an oxygen containing gas, wherein at least a portion of the first and/or second surface comprises a nanostructured carbon material (NCM) coating deposited thereon, said coating having a thickness of 1 nm to 5 μm.

17 Claims, 11 Drawing Sheets

(56) References Cited

U.S. PATENT DOCUMENTS

| | | | |
|---|---|---|---|
| 2007/0243124 A1 | 10/2007 | Baughman et al. | |
| 2007/0292622 A1 | 12/2007 | Rowley et al. | |
| 2008/0054836 A1 | 3/2008 | Rodnunsky et al. | |
| 2008/0268318 A1 | 10/2008 | Jang et al. | |
| 2009/0017361 A1 | 1/2009 | Lim et al. | |
| 2009/0042087 A1 | 2/2009 | Hori et al. | |
| 2011/0020733 A1* | 1/2011 | Iino | H01M 8/0213 429/514 |
| 2013/0243974 A1* | 9/2013 | Jung | C23C 18/1639 427/560 |
| 2016/0257833 A1 | 9/2016 | Sivarajan et al. | |
| 2017/0341938 A1* | 11/2017 | Humfeld | C01B 32/16 |

FOREIGN PATENT DOCUMENTS

| | | |
|---|---|---|
| JP | 2006-063436 A | 3/2006 |
| JP | 2006069848 A | 3/2006 |
| JP | 2007-042286 A | 2/2007 |
| JP | 2007182356 A | 7/2007 |
| JP | 2007182357 A | 7/2007 |
| JP | 2007-305463 A | 11/2007 |
| JP | 2009149503 A | 7/2009 |
| JP | 2009252713 A | 10/2009 |
| JP | 2009298625 A | 12/2009 |
| WO | WO-9743116 A1 | 11/1997 |
| WO | WO-2006033462 A2 | 3/2006 |
| WO | WO-200854836 A2 | 5/2008 |
| WO | WO-2011019970 A1 | 2/2011 |

* cited by examiner

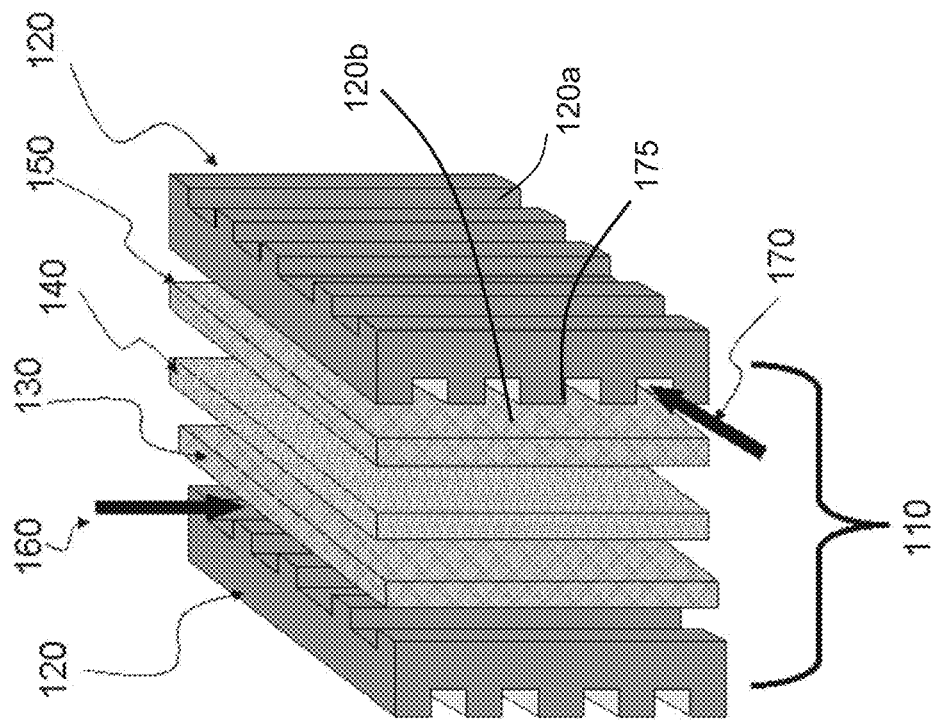
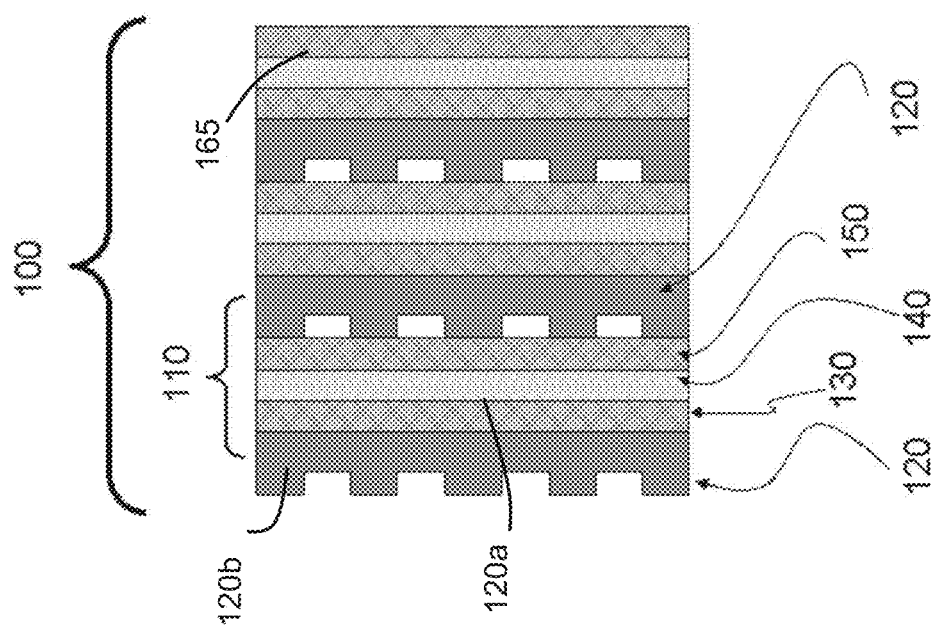
FIG. 1A
FIG. 1B
PRIOR ART

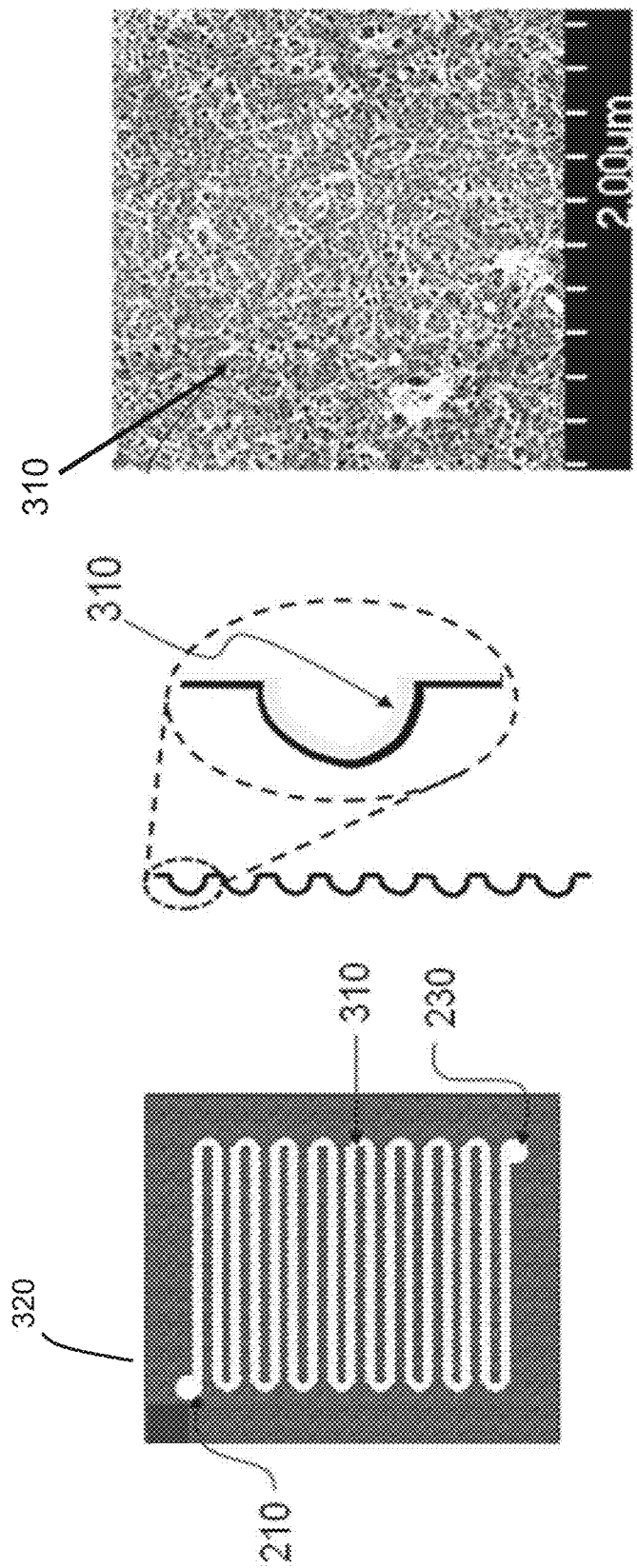

SOLUTION BASED NANOSTRUCTURED CARBON MATERIALS (NCM) COATINGS ON BIPOLAR PLATES IN FUEL CELLS

INCORPORATION BY REFERENCE

All patents, patent applications and publications cited herein are hereby incorporated by reference in their entirety in order to more fully describe the state of the art as known to those skilled therein as of the date of the invention described herein.

CROSS-REFERENCE TO RELATED APPLICATIONS

The present application is a divisional application of U.S. patent application Ser. No. 13/322,205, filed on May 14, 2012, to be issued as U.S. Pat. No. 9,966,611, which is a national stage application of PCT/US2010/037784, filed on Jun. 8, 2010, which claims the benefit of U.S. Provisional Application No. 61/185,491, filed on Jun. 9, 2009, all the contents of which are hereby incorporated by reference herein in its entirety.

BACKGROUND OF THE INVENTION

The technology described is in the field of fuel cells especially proton exchange membrane (PEM) fuel cells.

This subject matter of the disclosure relates to a component known as the bipolar plate, also known as interconnect plate, which serves as one of the key components employed in the construction of fuel cells.

More specifically, the subject matter of the disclosure relates to protective coatings for metallic, plastic or composite bipolar plates in which the protective coatings function as barriers against corrosion and ion contamination of the proton exchange membrane (PEM).

The schematic diagram of a typical PEM fuel cell using hydrogen as fuel is shown in FIG. 1 in cross-section (FIG. 1A) and exploded (FIG. 1B) views. A PEM fuel cells typically consists of a stack (100) of repeating units or single cells (110), each cell made of individual components. The cell (110) consists of a bipolar flow plate (120) containing an inlet/outlet (I/O) side (120a) for the hydrogen fuel gas and water vapor, a porous anode (130), a polymer electrolyte membrane (140), a porous cathode (150), and an oxygen/air inlet/outlet side (120b) of the flow plate (120). A single plate, in which the I/O flow patterns for the fuel (anodic side) and I/O pattern for oxygen/air inlet/outlet (cathodic side) are engraved or embossed on the opposite sides, is referred to as the "bipolar plate" in a PEM fuel cell.

Fuel hydrogen gas (160) entering the flow paths (165) of bipolar flow plate (120) on the anode side is ionized to protons and electrons on the catalyst surface at the anode. The protons transport through the proton exchange membrane (140) and reach the cathode (150). The electrons leaving the anode travel through an external load to reach the cathode, where they react with the oxygen/air supplied (170) as oxidant through the flow channels (175) on the cathode side of the bipolar plate and form oxide anions. The protons reaching the cathode react with the oxygen ions generated at the cathode to form water.

A schematic diagram of a conventional bipolar flow plate is shown in FIG. 2. The bipolar plate (200) consists of an inlet port for fuel gas and moisture (210) and an outlet port for the unused gas (230). The gas passes through the flow channels (220) engraved or embossed in the plate for directing uniform flow of the gases over the electrode surface for maximal contact. The flow channel paths can be of a variety of types, most common being serpentine path and a parallel flow path. A typical serpentine flow channel path (220) for inlet gases is also shown in FIG. 2A. FIG. 2B is an enlarged view of the flow path. A similar flow channel (not shown) is found on the opposite face of the flow plate for passage of oxidant gases past the cathode. In a fuel cell, the bipolar flow plates are stacked in such a way that the gas inlet channels engraved on both sides for the fuel gas and the oxidant gas respectively contact their respective electrodes.

Due to the complexity of the processes that take place in a PEM fuel cell, a bipolar plate fulfills several important functions in a fuel cell, including:

(a) Distribution of the fuel and oxidant separately and evenly over the respective electrode areas;

(b) Providing mechanical support to the membrane exchange assembly;

(c) Electron transport;

(d) Accommodation of internal manifolds for gases and coolant liquids;

(e) Handling stack seal stresses, and (f) Thermal management within the cell.

Bipolar flow plates serve as electronic conductors in the anodic as well the cathodic side. This requires them to have excellent through-plate electronic conductivity but no ionic conductivity or gas permeation through them. Some of the material characteristics that are needed to meet the functional requirements of the bipolar plate in a fuel cell are (a) high electrical and thermal conductivity (b) poor hydrogen permeability (c) high mechanical strength (d) low density and (e) easy manufacturability at low cost.

Bipolar plates have been made out of a variety of materials and methods, most often solid blocks of machined graphite. Machined metal plates mostly of stainless steel are also known in the prior art. Another type of flow plate is a filled polymer composite material.

Each of these approaches has certain advantages but also faces major difficulties on one or another important requirement. For example, graphite bipolar plates are considered state of the art, but have huge machining costs and also lack the mechanical strength. Metals, while being excellent conductors and having lower material costs, do not have the corrosion resistance required in an aggressive redox environment. Filled polymer composites do not meet critical through-plane conductivity requirements or gas-permeability requirements.

Among the composite types, compression molded graphite particles in a thermoplastic polymer have been examined in detail. The process involves mixing graphite and thermoplastic granules in a mold, and heating it above the glass transition temperature ($T_g$) of the polymer under pressure until the materials mix together and flow into the mold. The major advantage claimed by this method is the ability to load higher volume fractions of the filler, thereby increasing the electrical conductivity. However, this method is marked by a slow production cycle limited by the cooling cycle for the mold.

Carbon-carbon composites are also suitable materials for bipolar plates. Simple graphite-carbon composite systems are noted for their advantages of lower contact resistance, high corrosion resistance and easy manufacturability. But, they are limited by poor bulk electric conduction, low volume density for power and gas permeation rates that leave large room for improvement. More complex systems, e.g., a three-component carbon-polymer-metal system, can provide better performance, but the cost of manufacturing is prohibitive.

Metals such as aluminum, titanium, nickel or alloys like stainless steel as materials for bipolar plates have advantages due to their better mechanical properties, higher electrical conductivity, lower gas permeability and low cost of manufacture. However, metals have two serious limitations in terms of the electrochemical processes that take place at their surface: (a) formation of non-conductive surface oxides (corrosives) in a PEM fuel cell environment resulting in a high contact resistance which eventually lowers the efficiency of the PEM fuel cell system and (b) the dissolution of metal cations from the alloys and their subsequent contamination of the membrane electrode assembly (e.g., anode, separator and cathode assembly) will cause eventual system failure.

A recognized method to solve the corrosion problem has been to coat the surface of the metal bipolar plate with a material that forms a barrier to corrosion and at the same time will not diminish the advantageous properties of the metallic bipolar plate. Some of the promising corrosion barrier coatings that have been tested on metal plates including stainless steel plate surfaces include chromium nitride (CrN) and titanium nitride (TiN). However, high vacuum conditions and high temperatures (ca. 900° C.) required to ensure the formation of non-brittle phases of CrN needed for this approach limit its scale and therefore the low cost manufacturability of this approach. In addition, the presence of metal ions from the barrier layer leaves the potential for the diffusive contamination through the barrier layer into the membrane electrode assembly.

Carbon nanotubes (CNT) are seamless tubes formed from a single sheet of graphite (graphene). CNTs are well known for their superior electrical, mechanical and thermal properties arising from their unique electronic structure.

Carbon nanotubes have been used to coat metal bipolar plates. The CNTs are deposited by a chemical vapor deposition method mainly to render the bipolar plate hydrophilic for better water management properties in the PEM fuel cell. The growth of defect free layers of carbon nanotubes by chemical vapor deposition on large area metal substrates is prohibitively expensive for practical usage.

SUMMARY

A cost-effective and effective method for achieving corrosion resistant coatings on the bipolar plates is described.

A cost effective and low temperature method for the formation of nanostructured carbon coatings on bipolar plates includes deposition from a stable dispersion of nanostructured carbon materials in common industrial solvents including water. The dispersions are compatible with cost effective and well established industrial coating methods like spray, dip or squeeze coating.

In one aspect, a fuel cells includes a first flow plate for the introduction of hydrogen fuel gas and water vapor, a porous anode, an electrolyte, a cathode, and a second flow plate for the introduction of an oxygen containing gas, wherein at least a portion of the first and/or second flow plate comprises a nanostructured carbon material (NCM) coating deposited thereon, said coating having a thickness of 1 nm to 5 µm, or for example, 100 nm-200 nm.

In one or more embodiments, the coating is solution deposited.

In any one of the above noted embodiments, the coating is substantially conformal to a surface of the flow plate.

In any one of the above noted embodiments, the nanostructured carbon material is an aspected carbon material and the aspected carbon material is oriented substantially in plane with the first or second flow plates.

In any of the above noted embodiments, the nanostructure carbon material comprises one or more of carbon nanotubes, aspected carbon particles, structureless amorphous carbon, exfoliated graphite sheets, graphene or a combination of one or more of the above.

In any of the above noted embodiments, the nanostructure carbon material includes carbon nanotubes and one or more of structureless amorphous carbon, exfoliated graphite sheets or grapheme.

In any of the above-noted embodiments, the carbon nanotubes as part of the NCM coating have in plane orientation and strong $\pi$-$\pi$ interaction among the carbon nanotubes compared to CVD grown forests of carbon nanotubes wherein the carbon nanotubes chemical vapor deposition orient normal to the coated metallic bipolar surface.

In any of the above-noted embodiments, the NCM coating possesses in-plane orientation and strong overlap of the solution deposited CNTs resulting in an increased in-plane conductivity of the NCM coating compared to the in-plane conductivity of the coating provided by a vertically grown CNT forest.

In one or more embodiments, the in-plane oriented carbon nanotubes have the hexagonal carbon lattice of the $sp^2$ hybridized carbon nanotubes aligned horizontally to the metallic bipolar plate leaving the $p_z$ orbitals at the carbon sites oriented normal to the metallic bipolar plates.

In any one of the above noted embodiments, the coating is a NCM-carbon composite layer, and, for example, both the first and second flow plates comprises an NCM coating.

In one aspect, a method of depositing a carbon layer includes applying a layer of nanostructured carbon material (NCM) to a substrate from a dispersion of NCM in a carrier liquid; applying a carbon forming polymer to the substrate, wherein a layer comprising NCM and polymer is obtained; and heating the NCM and polymer-containing layer under conditions to convert the polymer into a conductive carbon phase.

In one or more embodiments, the carbon forming polymer is applied from solution.

In one or more embodiments, the carbon forming polymer is applied as a dispersion, and for example is included in the dispersion of NCM material.

In any one of the above noted embodiments, the carbon forming polymer is in solution.

In any one of the above noted embodiments, the carbon forming polymer is dispersed.

In any one of the above noted embodiments, the heating conditions include an atmosphere comprising about 1 to 100 volume percentage of inert gas mixed with the remaining portion of oxidizing gas by volume, and for example, the conditions include a temperature in the range of about 100 to 700° C.

In any one of the above noted embodiments, the method further includes electrochemical cycling of the NCM coated plate through a chosen voltage and current range in an acidic medium or a basic medium as part of surface preparation or conditioning.

In any one of the above noted embodiments, the NCM dispersion further comprises a surfactant or a thickening agent.

In any one of the above noted embodiments, the substrate is a flow plate for use in a fuel cell.

In one aspect, a bipolar plate for fuel cells includes a flow plate having a first surface for the introduction of a first gas and water vapor and a second surface for the introduction of a second gas, wherein at least a portion of the first and/or second surface comprises a nanostructured carbon material (NCM) coating deposited thereon, said coating having a thickness of 1 nm to 5 μm, and for example having a thickness of about 100 nm to about 200 nm.

DETAILED DESCRIPTION OF THE DRAWING

The invention is described with reference to the following figures, which are presented for the purpose of illustration only and are not intended to be limiting.

FIGS. 1A-1B are schematic diagrams of a cross section of a typical PEM fuel cell stack (FIG. 1A) in cross-section and (FIG. 1B) in exploded view.

FIG. 3A is a schematic diagram of a bipolar plate surface coated with an NCM coating (300) showing a serpentine type gas flow path; FIG. 3B is a schematic of the cross section of the plate with a zoom in view of the gas flow channel and the NCM coating (the coating thicknesses of the plate and the coating are not relative); and FIG. 3C is a scanning electron micrograph of a typical dense coating of a single walled carbon nanotube network, according to one or more embodiments.

Figure 2B:
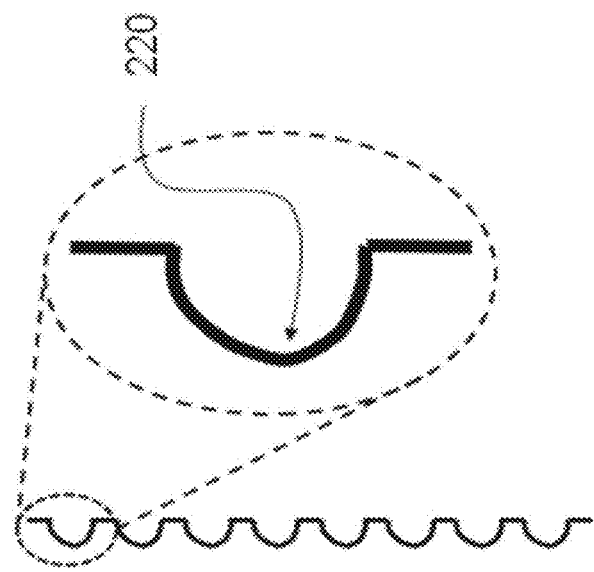
FIGS. 2A-2B are schematic diagrams of a bipolar plate surface showing a serpentine type gas flow path (FIG. 2A) in plane view and (FIG. 2B) in an exploded view of the flow path.
Figure 2A:
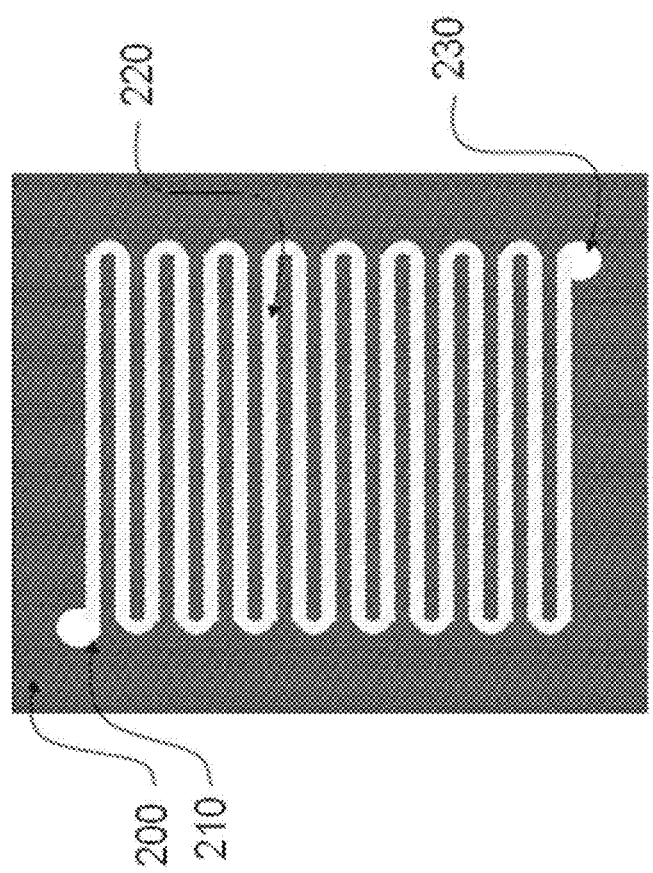
Figures 4A, 4B, 4C:
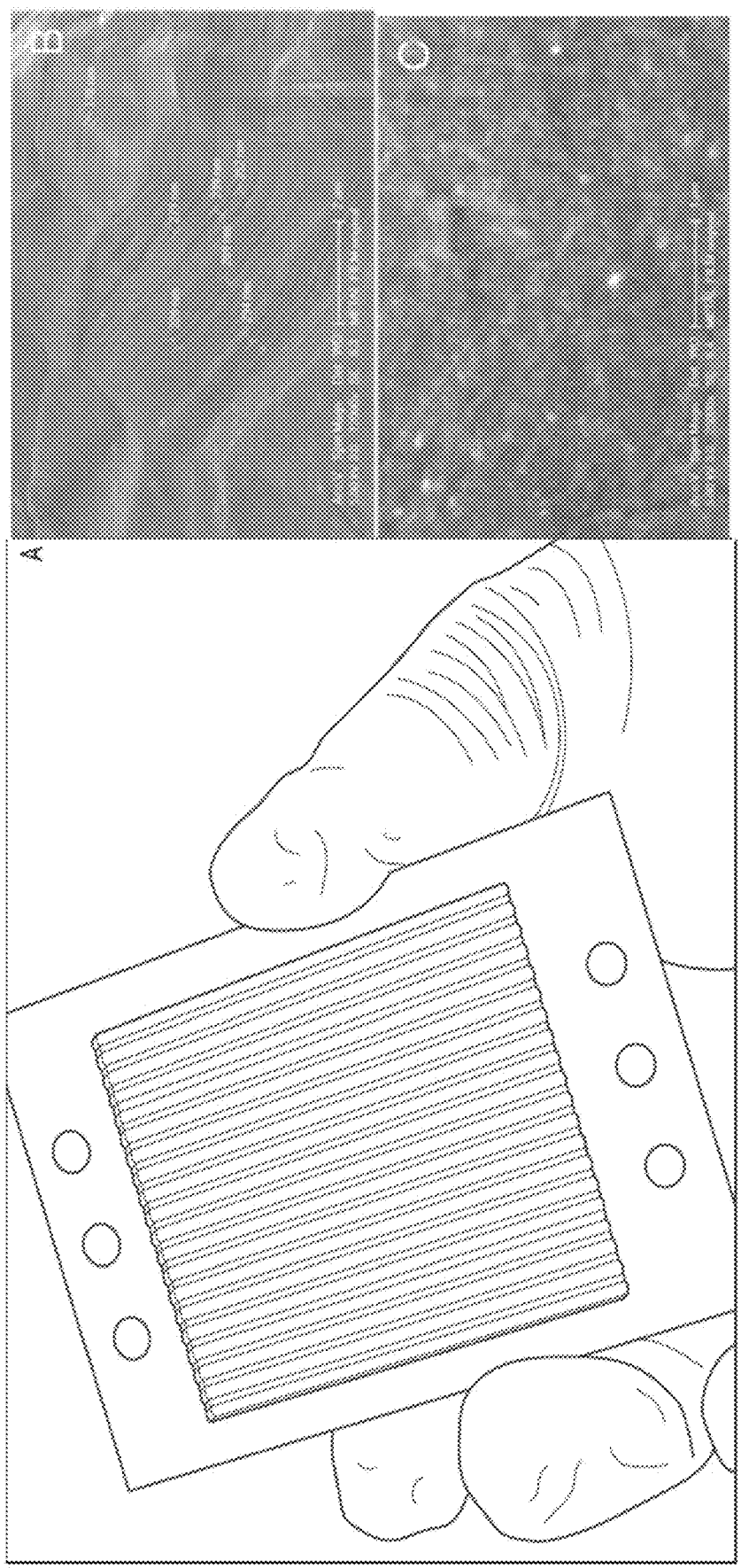

FIG. 4A shows an 18 inch square active area, commercial stainless steel bipolar plate with parallel flow path coated with a dense network of carbon nanotubes from suspension; FIG. 4B is a scanning electron micrograph of the plate surface at low magnification; and FIG. 4C scanning electron micrograph at high magnification.

Figure 5:
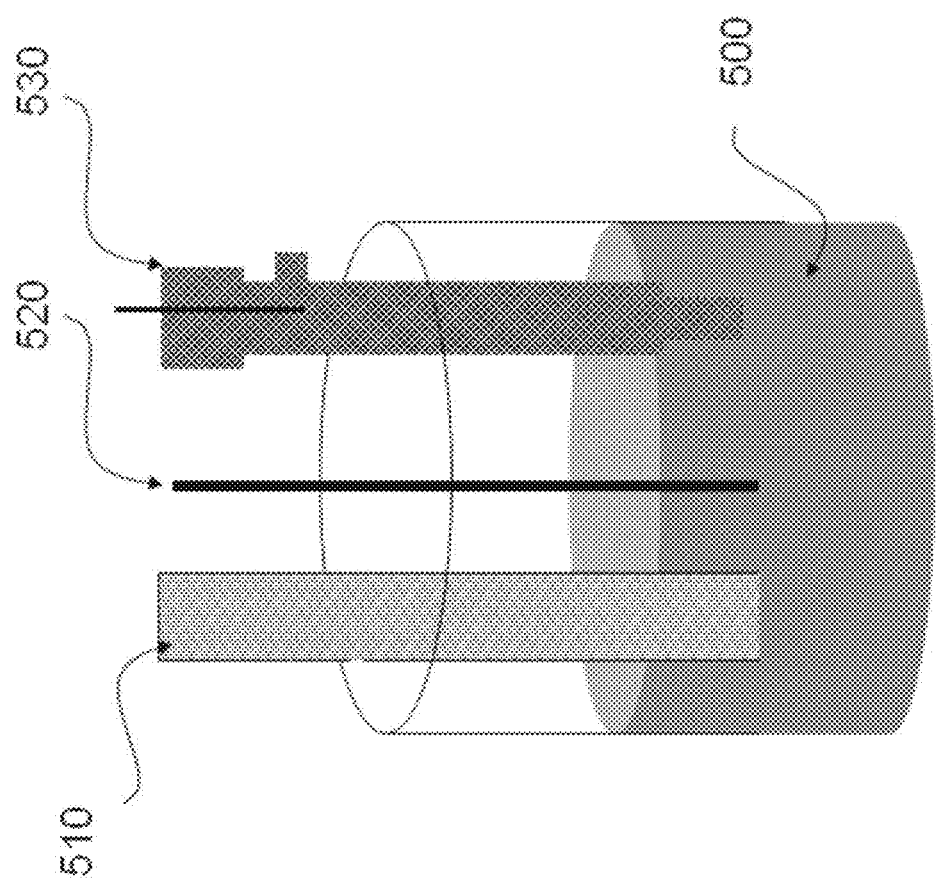

FIG. 5 is a schematic of the experimental cell used to measure the open cell potential of the CNT coated metal plate sample and the control.

Figure 6:
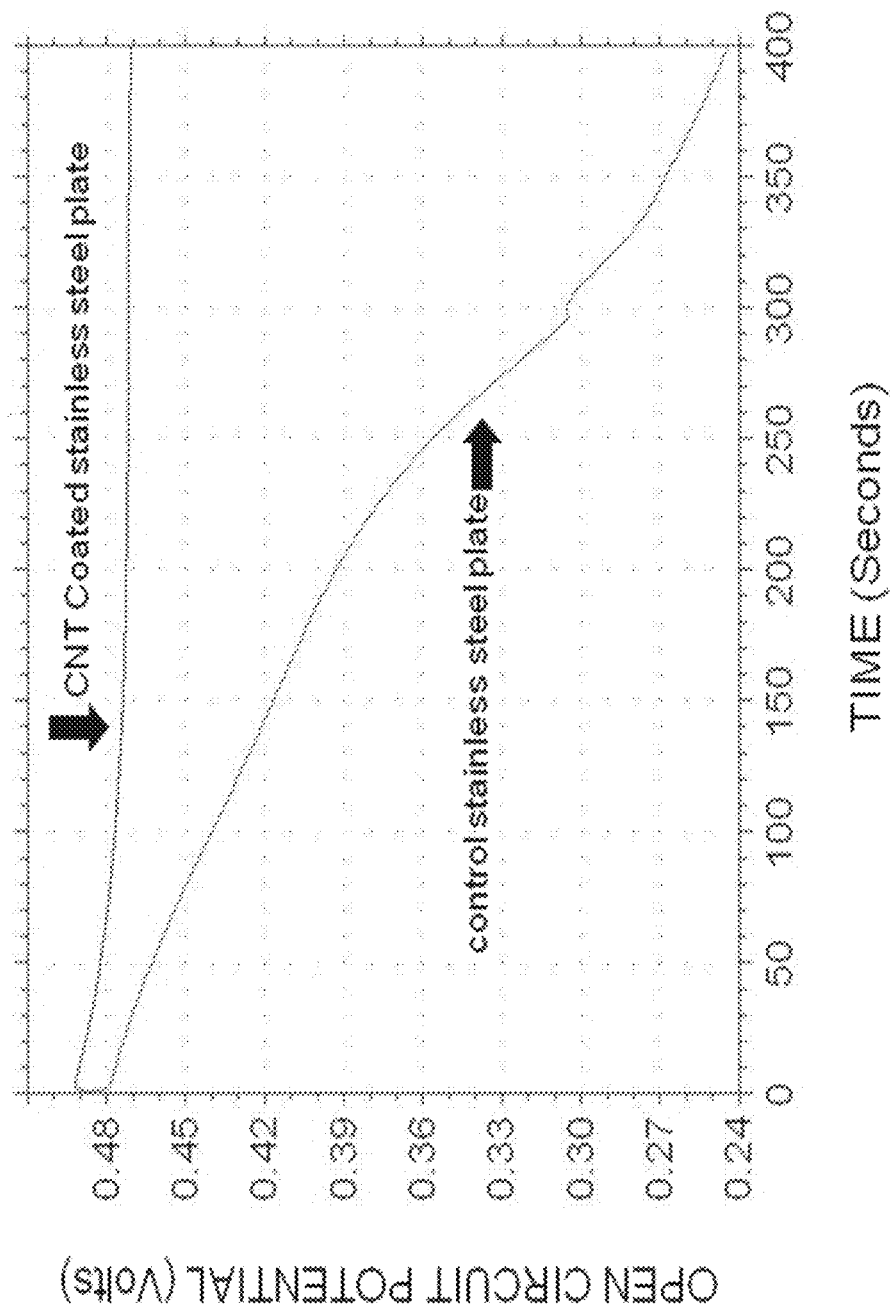

FIG. 6 shows plots of the variation of the open cell potential of the CNT coated stainless steel metal piece and the corresponding control sample without the coating.

Figure 7:
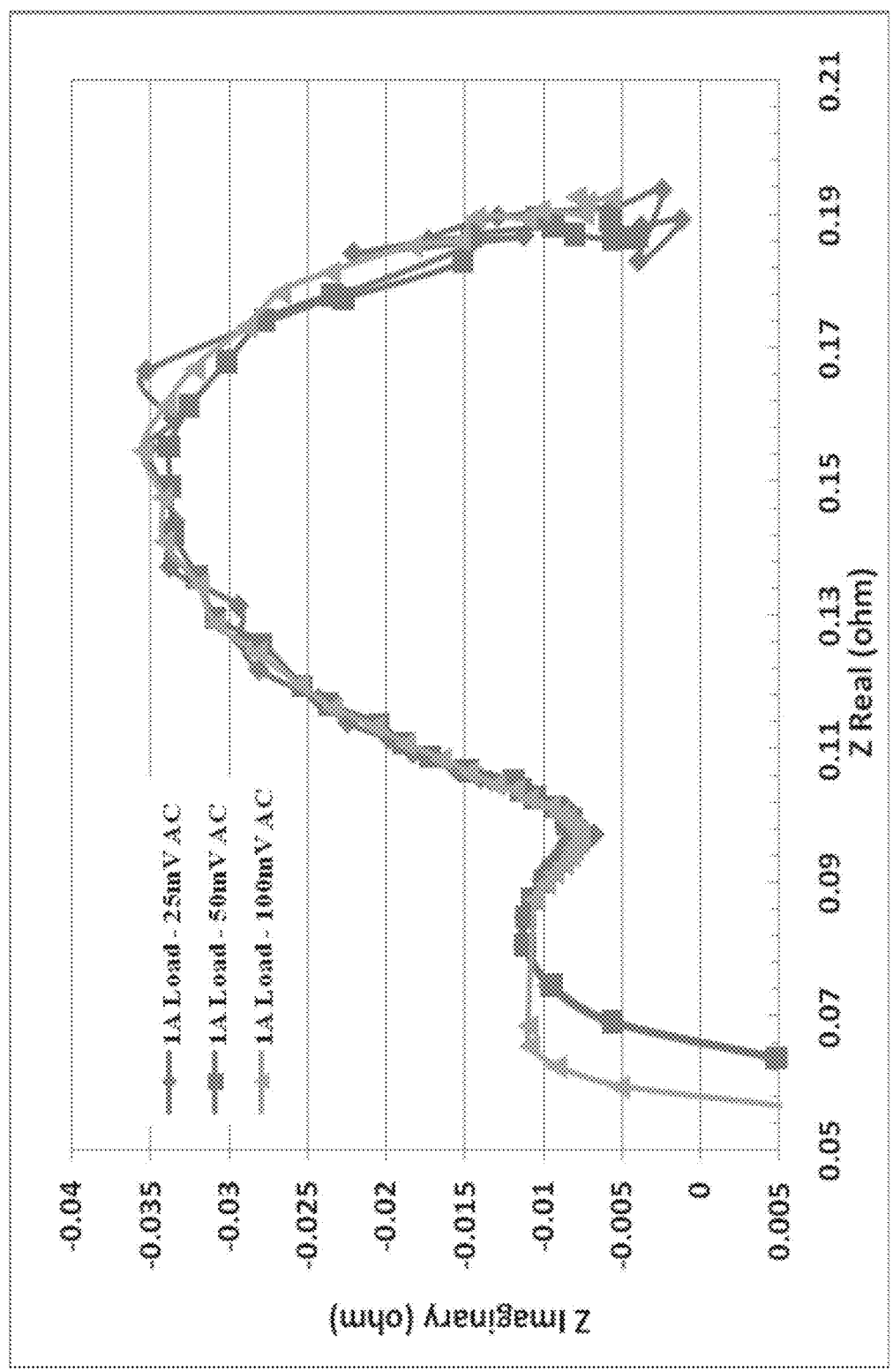

FIG. 7 is a Nyquist plot of 14.28 cm$^2$ active area BASF Celtec P1000 membrane/electrode assembly at 150° C. with $H_2$ fed to the anode and $O_2$ to the cathode using coated plates under varying AC modulation amplitudes at a load current of 1 A (70 mA/cm$^2$).

Figure 8:
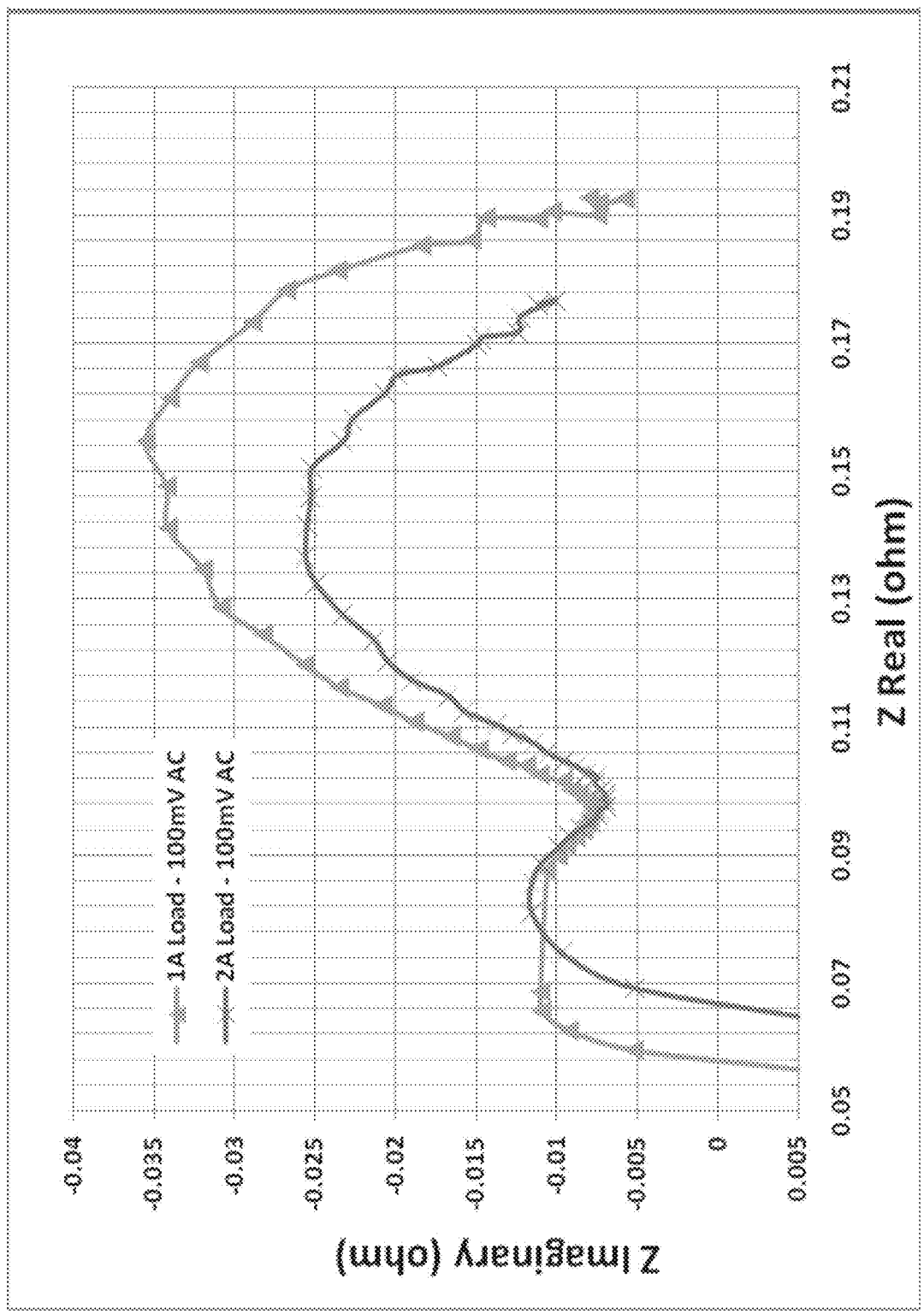

FIG. 8 is a Nyquist plot of a high temperature PEM (HTPEM) fuel cell with coated plates showing the variation of impedance at different load currents.

Figure 9:
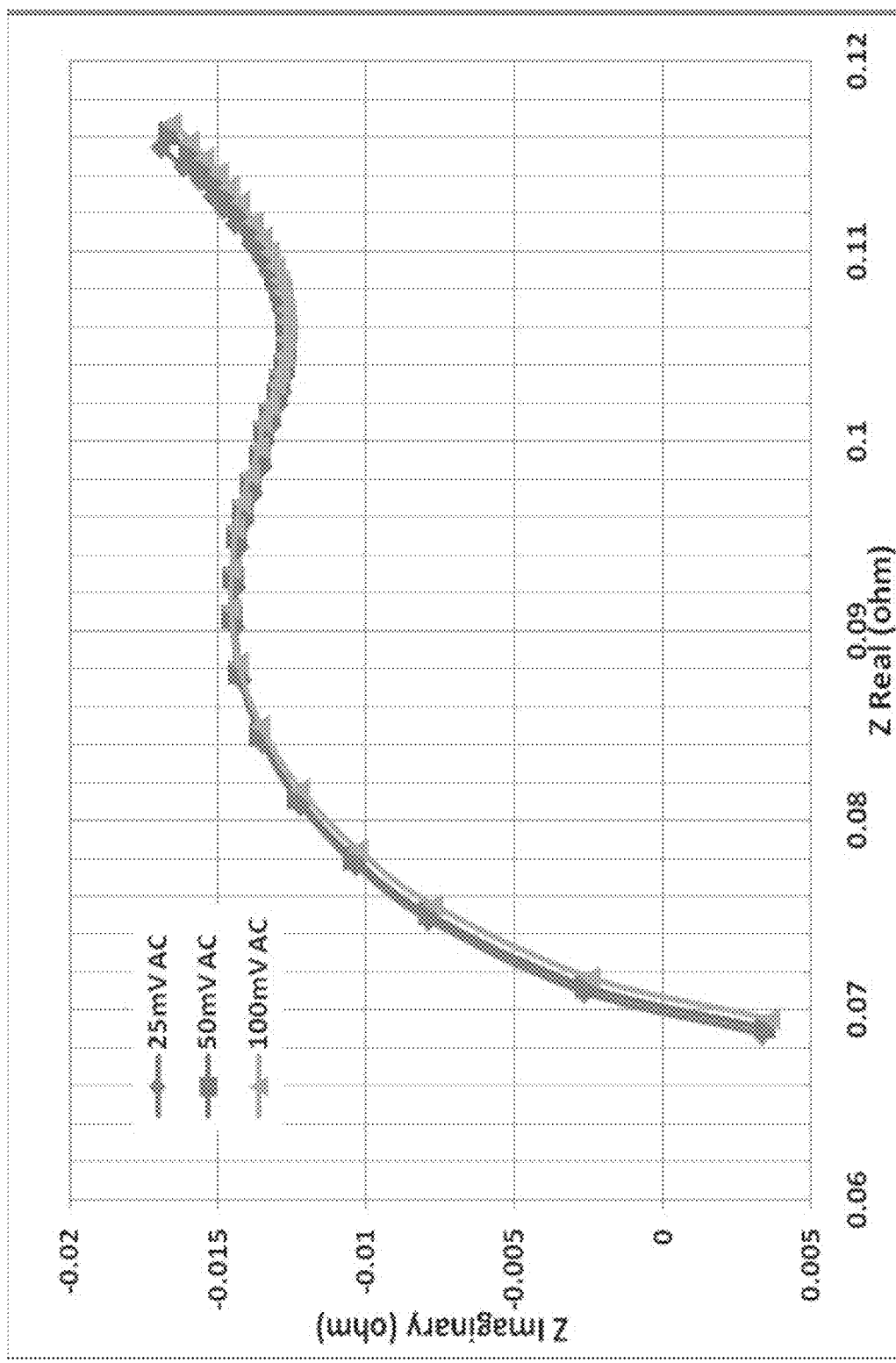

FIG. 9 shows Nyquist plots of a HTPEM fuel cell with coated plates showing the variation of impedance at various AC modulation amplitudes when run as a blocking electrode.

Figure 10:
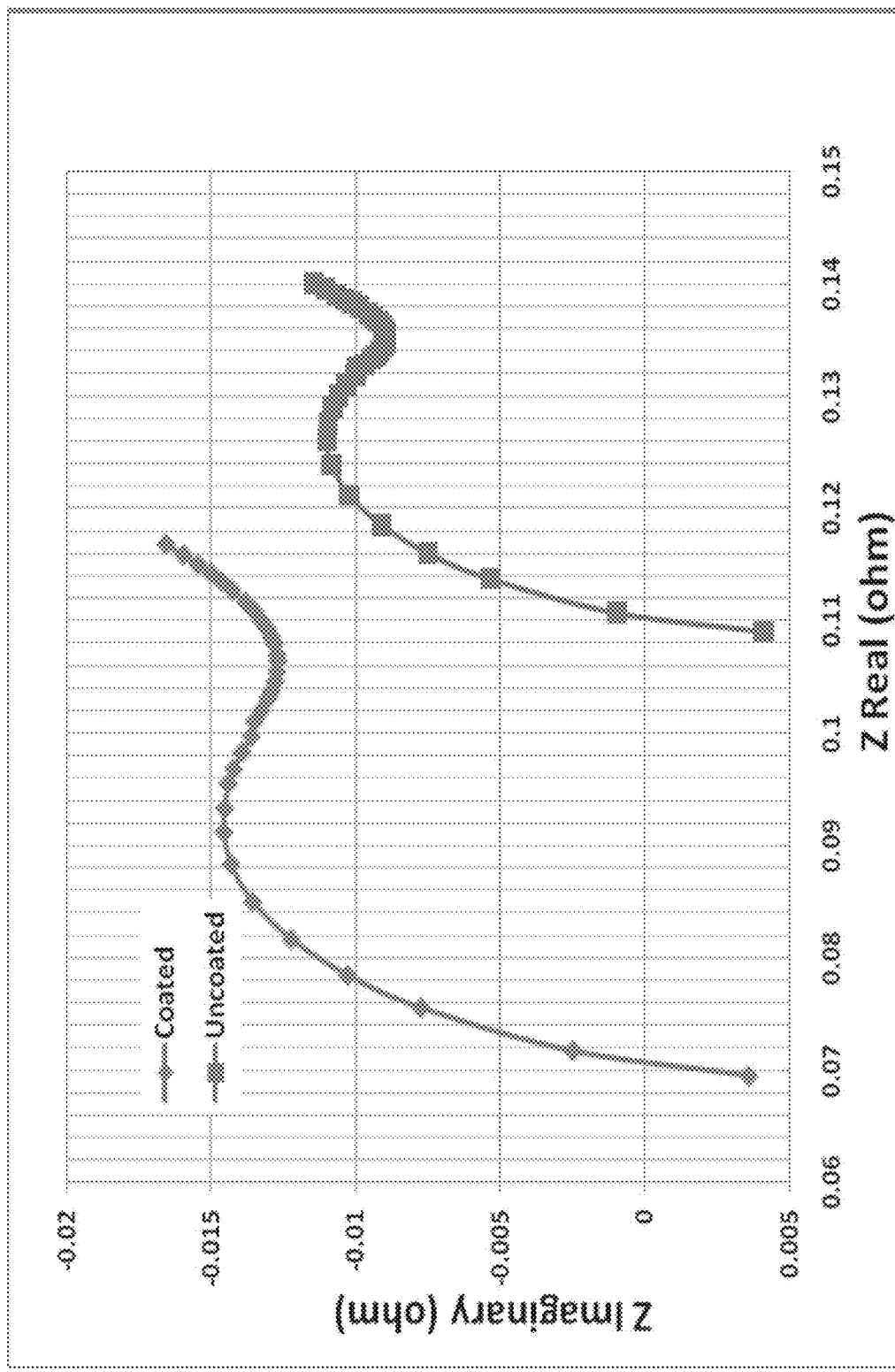

FIG. 10 illustrates the impedance of a HTPEM fuel cell with both coated and uncoated bipolar plates when run as a blocking electrode.

Figure 11:
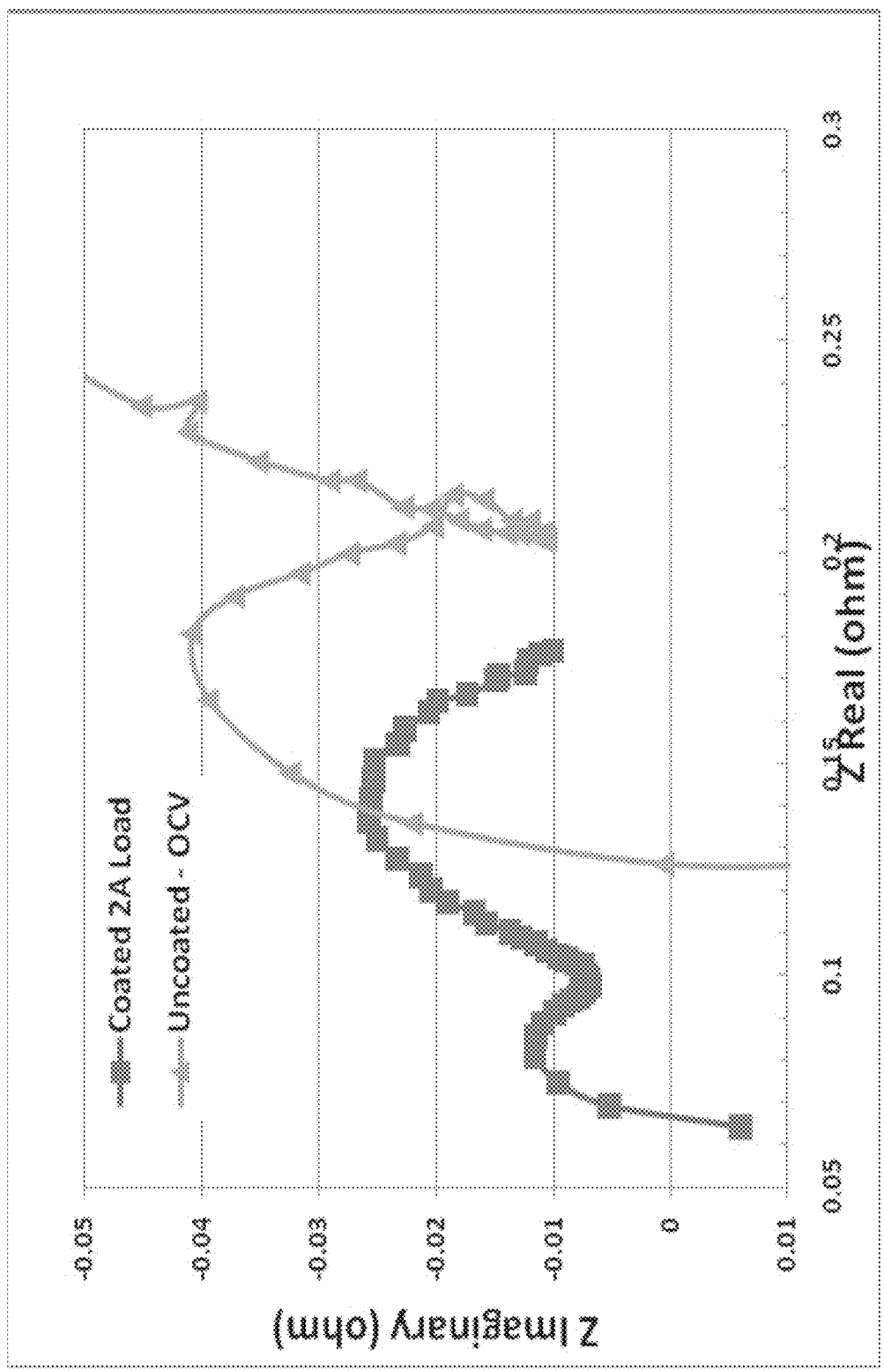

FIG. 11 illustrates the impedance of a HTPEM fuel cell with both coated and uncoated bipolar plates when run as a blocking electrode.

DETAILED DESCRIPTION

This disclosure provides an ultrathin, dense coating of nanostructured carbon materials (NCM) deposited from a solution to provide an anticorrosive layer on bipolar plates for use, for example, in PEM fuel cells. Without being limited by the type of the fuel cell, this description focuses by way of example, on fuel cells that employ polymer electrolyte membranes as proton conduction medium. FIGS. 3A-3C are an illustration of a flow cell with a NCM coating according to one or more embodiments. The schematic diagram of a bipolar plate surface (300) coated with an NCM coating (310) shows a serpentine type gas flow path as an example. The entire surface (or substantially the entire surface) including the non-planar surface of the flow channel path (320) for inlet gases is coated with an ultrathin dense network of NCM (310). The plate defines flow paths (320) on the cathode side (and similar flow path (330) on the anode side) for a fuel cell. The bipolar cell can include other features such as cooling channels filled with cooling liquid to control the fuel cell temperature. FIG. 3B provides a cross sectional illustration of the plate with a zoom in view of the gas flow channel and the NCM coating. The coating thicknesses of the plate and the coating are not relative. FIG. 3C is a scanning electron micrograph of a typical dense coating of a single walled carbon nanotube network deposited on a sapphire substrate shown as an example. The NCM coating provides substantially complete coverage and absence of micro scale voids in the coating.

The bipolar plates are made of a suitable electrically conductive material. In one or more embodiments, the bipolar plates are made of metal and they may be made of any metal like iron, cobalt, nickel, aluminum or an alloy like stainless steel and in any shape. They can be formed of, e.g., molded or stamped out of, a single sheet or they can be stamped with the impression of one side of the plate and welded together. The bipolar plate can also be made of a polymer, plastic or a reinforced plastic composite.

The thickness of the bipolar plates can range from a fraction of a thousandth of an inch (mil) to several tens of mils. Gas and fluid flow patterns on the metallic bipolar plates can be embossed, stamped, engraved or chemically etched. In the case of plastic or plastic composites the bipolar plates can be compression or injection molded.

The NCM includes electronically conductive carbon material. In certain embodiments, NCM includes aspected carbon particles such as purified (>99% carbon content), semipurified (60-99% carbon content) or unpurified (<60% carbon content) single, double or multiwalled carbon nanotubes including with low levels of catalyst metal residue. Single-walled carbon nanotubes (SWNT) are formed by rolling up a graphene sheet with the roll up vector defined by a set of indices (n, m) on the hexagonal carbon lattice indicating the diameter and helicity of the tubes. Multi-walled Carbon Nanotubes (MWNT) are structures formed by nesting of two or more tubes concentrically within each other. In addition to aspected carbon particles, NCM also includes structureless amorphous carbon, exfoliated graphite sheets, graphene or a combination of one or more of the above.

The carbon nanotubes as part of the NCM coating have in plane orientation and strong π-π interaction among the carbon nanotubes compared to CVD grown forests of carbon nanotubes that orient normal to a coated metallic bipolar surface. Furthermore, such CVD deposited nanotubes are limited to metallic substrates coated with the appropriate catalyst.

The in plane orientation and strong overlap of the solution deposited CNTs provides an increased in-plane conductivity of the NCM coating as compared to the in-plane conductivity of the coating provided by a vertically grown CNT forest.

The in-plane oriented carbon nanotubes have the hexagonal carbon lattice of the sp$^2$ hybridized carbon nanotubes aligned horizontally to the bipolar plate leaving the p$_z$ orbitals at the carbon sites oriented normal to the metallic bipolar plates. This is the surface chemical structure most closely resembling that in a machined graphite bipolar plate.

The NCM coating is formed on the plate surface by depositing the NCM from a suspension of the NCM in a solvent system consisting of one or more organic solvents and/or water. Suitable solvents include, N-methylpyrrolidone, dimethylformamide, toluene, xylene, trimethylbenzene, cyclohexanone, chlorobenzene, ortho-dichlorobenzene, propylene glycol monomethyl ether acetate and dimethylsulfoxide among others. The NCM coating can be on one or both sides of the plate as required. In particular, NCMs are deposited on the surface area that is exposed to the reactant gases and the proton exchange membranes and the surface areas that will come in contact with coolant water.

Though not limited to the following classes, the NCM dispersions described in this invention can fall under several broad categories.

(a) The dispersion consists of an ionic or non-ionic surfactant in a medium, which remains fully or partially as part of the NCM coating after the last stage of post-processing of the coating.

(b) The dispersion consists of an ionic or non-ionic dispersal aid that is removed from the NCM coating substantially or completely during the deposition of the coating or after the last stage of post-processing of the coating.

(c) The dispersion consists of a polymeric dispersal aid or viscosity adjusting agent that is removed from the NCM coating substantially or completely during the deposition of the coating or after the last stage of post-processing of the coating.

(d) The dispersion consists of a polymeric or non-polymeric dispersal aid or viscosity adjusting agent or an additive that is converted in-situ into a form of carbon and forms part of the NCM coating during the deposition of the coating or during or after one of the stages of post-processing of the coating.

The NCM dispersion includes a solid NCM content in the range of about 1 mg/L to about 10 g/L. The NCM is suspended in the solvent system to form a stable or meta-stable dispersion with or without the aid of a surfactant system as a dispersal aid. In one or more embodiments, the surfactant can be a cationic, anionic or non-ionic surfactant. In one or more embodiments, the dispersal aid can also be an oligomeric or polymeric molecule. Common surfactants include anionic surfactants such as sodium dodecyl sulfonate, sodium dodecyl benzene sulfonate and poly-styrene sulfonate, among others.

The stable NCM dispersion can also include a viscosity adjusting agent for controlling the viscosity of the NCM dispersion. Polyvinyl alcohol, polyvinyl acetate and carboxy methyl cellulose are all examples of polymeric materials that can function as viscosity adjusting agents. The range of viscosity of the carbon nanotube dispersion can be from 1 centipoise to several million centipoise at application temperatures, e.g., ca 20-300° C.

The NCM dispersion thus formed is applied onto bipolar plate substrates by any suitable fluid coating technique. Suitable techniques include spin coating, dip coating, spray coating, doctor blade coating or by squeegee coating. The NCM coating can be deposited on heated or unheated substrates, for example, the substrate can be in the range of 20-300° C. Alternatively, the applicator liquid containing the NCM can be heated. Temperatures are limited by the boiling or decomposition temperatures of the carrier liquid and any additives included in the liquid. The NCM coating can be applied using a single step or in multiple steps, and the coating can be annealed between applications to remove excess solvent, to remove any residual additives from the layer and/or to form a second residual carbon phase. The coating step can be selected to provide the desired thickness and coverage of the substrate. For example, increasing the volume the NCM dispersion or the time of the application of the NCM suspension applied to the substrate can increase the amount of NCM in the coating. In some embodiments, the coating has a thickness in the range of about 1 nm to about 5 μm, and for example, can be about 100 nm to about 200 nm. In some embodiments, the coating has a coverage or density with porosity less than 1% as determined by the area of pores on the top exposed layer relative to the total area of the metallic surface covered by the NCM, determined by the surface coverage on a monolayer multiplied by the number of monolayers. In one or more embodiments, the coating covers at least 95% of the surface. The coating process can be coupled with the drying process in a single step by carrying out the coating between temperatures ranging from ambient to 300° C. Alternately drying can be carried out in a separate second step.

The thus-formed NCM coating is annealed to form a coating of CNT network on the bipolar plate surface. Annealing can occur over a range of conditions, such as temperatures ranging from 90° C. to 400° C. in an ambience of air, inert gas or vacuum. The time of annealing can range from few minutes to several hours. Annealing of the bipolar plates can also be carried out by passing the plates through a flow-through oven with multiple heating zones.

In one or more embodiments, a NCM composite coating is provided having a second carbon phase.

In some embodiments, the composite coating consists of nanostructured carbon, graphite, suspended graphene or suspended structureless amorphous carbons. The second phase of carbon is provided in the suspension as an additive in the dispersion of carbon nanotubes or it can be generated in-situ to enhance electrical conductivity of the carbon nanotube network, and/or enhance thickness control of the NCM layer and/or enhance porosity control in the NCM layer (by filling in the voids generated in a random network of carbon nanotubes) and/or enhance adhesion to the metallic bipolar plate (by increasing surface contact) and/or enhance corrosion resistance (by decreasing porosity) and or enhance adhesion to the gas diffusion layer.

The composite NCM coating is formed on a metal surface using alternate coatings of an NCM suspension, e.g., a polymeric surfactant assisted NCM suspension, and a solution of a carbon-forming polymer base such as poly-acrylonitrile (PAN), poly-vinyl acetate or poly-vinyl chloride, among others. The whole structure is annealed at an appropriate temperature in a low supply of oxygen/air at high temperature to form dense nanostructured carbon composite film. A low oxygen content atmosphere can be used to promote the decomposition of the carbon containing polymer into carbon. The gas composition can be 1 to 100 volume percentage of an inert gas such as argon or nitrogen mixed with the remaining portion of air or oxygen by volume. The temperature of annealing can be in the range of 100 to 700° C. and the duration of the anneal can vary from fraction of an hour to several hours. The carbon-forming polymer can be in solution or a dispersion.

The NCM coating on the bipolar plate surface can also be formed by coating a blend of NCM and a polymer (such as poly-acrylonitrile among others) in water or a common organic solvent dispersant and coating the blend on the metal bipolar plate, followed by annealing of the entire structure at appropriate temperature, in a low supply of oxygen/air at high temperature to form dense nanostructured carbon-carbon composite coatings in-situ on the bipolar plate surface. The carbon-forming polymer can be in solution or a dispersion.

Multiple coating steps can be used and the aforementioned coating operations can be used repeated, alone or in combination with each other, to form a dense, chemically resistant conducting carbon coatings on metallic bipolar plates. In exemplary devices, the NCM layer is at a thickness of about 1 nm to about 5 µm, or for example, about 100 nm to 200 nm.

The NCM coated bipolar plate can be further passivated prior to use in a fuel cell assembly by means of electrochemical cycling process, in which the coated plate is placed in an acidic solution or basic solution and cycled through a chosen voltage range over one or more cycles. The acid can be any inorganic mineral acid including sulfuric, hydrochloric, nitric, phosphoric in dilute or concentrated forms. In this process, the acids can intercalate thin bundles of single walled carbon nanotubes and form a passive layer resistant to acid. Alternatively, a basic layer such as sodium hydroxide, potassium hydroxide or ammonium hydroxide can be used.

Besides serving as an anti-corrosion barrier as described above, the NCM coating on the metallic bipolar plate also serves as a barrier for the diffusion of metal ions from the bipolar plates contaminating the membrane exchange assembly (MEA) and to reduce the contact resistance between the gas diffusion layers (GDL) and the bipolar plate under normal conditions as well under compression.

The method and coating provides several distinct advantages over CVD-grown CNT coatings. The CVD conditions tend to produce vertically grown MWNT which can be easily removed due to their poor adhesion to the substrates. In addition, the in-plane conductivity of the CNTs is much lower in vertically aligned CNTs, as compared to horizontally aligned CNTs. Due to the growth of the CNT in a direction normal to the surface of growth, the leaching of metal ions from a metallic bipolar plate through the channels and interstitial spaces cannot be avoided and will further be enhanced by hydrophilic CNT coatings. The contamination of the PEM membrane by the metal ions leached from the bipolar plates is one of the major blocks in their practical usage.

Other techniques generally used to deposit CNTs include physical vapor deposition methods such as electron beam evaporation, magnetron sputtering and pulsed plasma processes. Electromagnetic Brush Coating (EMB) or simply brush coating can be used as a powder based coating technique for coating CNTs. These methods are substrate size limited and more expensive than chemical vapor deposition processes. In addition, brush coating requires the additional step of synthesizing CNTs in a separate step and transferring the CNTs as powder to the Brush coating equipment; the dry deposited CNTs are prone to poor adhesion on the coated substrate.

The current methods deposit films in which the nanostructured carbon is horizontal to the surface and forms conformal coatings that effectively protect the underlying surfaces. Furthermore, the orientation and density of the nanostructured carbon layer improves adhesion to the underlying area and reduced metal diffusion from an underlying metal plate.

EXAMPLES

Example 1

FIG. 4A shows of an 8 inch square active area bipolar plate (with parallel gas flow path made of SS316 stainless steel) available commercially that was coated on both the sides with a dense layer of single walled carbon nanotubes employing a CNT suspension in water that is free of ionic surfactants or polymers. The composition of the NCM in this case is dominated by more than 90% by single walled carbon nanotubes and the rest by amorphous carbon that forms an overcoat on the carbon nanotubes. The tubes were deposited from a surfactant free, water based ink. The procedure for the formation of the surfactant free inks is described in detail in U.S. Patent Application No. 61/234,203, filed on Aug. 14, 2009, and entitled "Solvent-based and Water-Based Carbon Nanotube Inks with Removable Additives," which is incorporated herein in its entirety by reference. The NCM layer was annealed post deposition in a vacuum oven (130 C, −1 torr for overnight) and slow cooled to room temperature. FIG. 4B is a scanning electron micrograph of the plate surface at low magnification (before coating) and FIG. 4C is a scanning electron micrograph at high magnification of the metal plate surface after coating.

Example 2

A small portion of the NCM deposited bipolar plate fabricated as described in Example 1 above was cut with shearing scissors to form an electrode of area approximately ¾"×2". The electrode was immersed in 1M $H_2SO_4$ to cover half the area of the metal plate and employed as working electrode in CH instruments electrochemical work station (model #600). A platinum wire was used as counter electrode. A standard calomel electrode (CH instruments) was used as a reference electrode. The open cell potential in the circuit was measured as a function of time. FIG. 5 is a schematic of the experimental cell used to measure the open cell potential of the CNT coated metal plate sample and the control. The cell consists of a glass beaker containing 1M $H_2SO_4$ (500), the sample to be studied in the form of a working electrode (510), a platinum wire as counter electrode (520) and a standard calomel electrode (530) as reference electrode. Also, a control experiment was conducted on an identical sample piece of working electrode without a protecting carbon nanotube coating. The sample with unprotected metal surface showed a rapid fall in the open circuit potential against a very stable reading for the protected sample over the same period. The results are shown in FIG. 6. The carbon coated cell demonstrated significant retention of the open circuit potential over time, as compared to the uncoated cell.

Example 3

Two NCM coated stainless steel bipolar plates as shown in FIG. 4A and described in Example 1 above were fabricated and a high temperature PEM fuel cell was constructed employing the coated plates and a 14.28 cm2 active area BASF Celtec P1000 membrane exchange assembly (MEA) at different load conditions to measure the impedance of the cell. A control cell with the uncoated bipolar plate was constructed following an identical procedure.

Example 4

The cell constructed with NCM coated SS316 as described in Example 3 above was run at 150° C. with $H_2$ fed to the anode and $O_2$ to the cathode. The stoichiometry was maintained at flow rates ratio of 3 volumes of hydrogen to 2 volumes of oxygen. Impedance of the cell is measured using an Electrochemical Impedance Spectroscopic (EIS) technique at different load currents of 1 A (70 mA/cm$^2$) and 2 A (140 mA/cm$^2$) respectively and at different AC modulation amplitudes. FIG. 7 shows the impedance of the cell under increasing AC modulation amplitudes under a 1 A load. As seen from the figure the cell impedance did not change at low AC modulation amplitudes but started to decrease at higher values. Table 1 shows the internal impedance of the cell at different AC modulation voltages at a load current of 1 A.

TABLE 1

Impedance of a HTPEM cell with NCM coated SS316 bipolar plates 1A load and at different AC modulation voltages

| AC Modulation Voltage (mV) | Internal Impedance (ohm) | Areal Impedance (ohm-cm2) |
|---|---|---|
| 25 | 0.066 | 0.94248 |
| 50 | 0.066 | 0.94248 |
| 100 | 0.054 | 0.77112 |

FIG. 8 shows the impedance of the fuel cell at different load conditions at 100 mV AC modulation amplitude. The cathode semi-circle is reduced due to the faster kinetics expected at increased load current. Table 2 lists the impedance measured at different loads. Note that the impedance at highest frequency (membrane and metal resistance) for the cell run at 2 A is now 0.95 Ohm which is similar to the 0.94 Ohm found for the cell at 1 A load with 25 and 50 mV ac modulation amplitude.

TABLE 2

Impedance of a HTPEM cell with NCM coated SS316 bipolar plates at 100 mV AC modulation voltage and different loads.

| Current Density (mAtcm2) | Internal Impedance (ohm) | Areal Impedance (ohm-cm2) |
|---|---|---|
| 70 | 0.054 | 0.77112 |
| 140 | 0.0667 | 0.95247 |

The series sum of the proton-conducting membrane resistance and electron-conducting metal resistance for the total cell area appears to be between 0.94 to 0.95 Ohm when evaluated at 1 A and 2 A loads. This is logical since the resistance should be near constant at constant temperature and hydration.

Example 5

The high temperature PEM fuel cell constructed as described in Example 3 was also run in a blocking electrode mode with $N_2$ fed to the anode and $N_2$ to the cathode as well. The cell temperature was maintained constant at 150° C. and the flow rates were maintained at a ratio of 1:1. FIG. 9 shows the impedance of the HTPEM fuel cell with coated plates when run as a blocking electrode at different AC modulation amplitudes. In all cases the total cell impedance was observed to be about 0.037 Ohm per 14 cm$^2$ which corresponds to 0.53 Ohm cm$^2$.

Example 6

In yet another example, the cell with NCM coated bipolar plates constructed as described in Example 3 was run in a blocking electrode mode in comparison with an identical cell constructed with uncoated bipolar plates as control. FIG. 10 shows the impedance of HTPEM fuel cell with both coated and uncoated plates when run as blocking electrode. For the coated plate the impedance is 0.106-0.069 Ohm or 0.037 Ohm per 14 cm$^2$ which corresponds to 0.53 Ohm cm$^2$. For the uncoated plate the impedance is 0.1305-0.109 Ohm or 0.022 Ohm per 14 cm$^2$ or 0.31 Ohm·cm$^2$. There is a slight increase in impedance due to the presence of the surface coating on the metal.

Example 7

FIG. 11 shows the impedance plots of a HTPEM fuel cell with coated and uncoated bipolar plates. However, since the data is not under steady state, the impedance of the cells cannot be compared at this point when run as a simple Randles cell. The highest frequency impedance of the coated plate is 0.053 Ohm per 14 cm$^2$ which corresponds to an areal resistance of 0.75 Ohm cm$^2$ with hydrogen fed to the anode and oxygen to the cathode. The high frequency impedance for the uncoated plate is 0.125 Ohm, which corresponds to an areal resistance of 1.785 Ohm cm$^2$ with hydrogen fed to the anode and oxygen to the cathode. With reactive gas on the uncoated plates, the high frequency increased substantially to 1.785 Ohm·cm$^2$. However, the NCM coated bipolar plates stayed at relatively low areal resistance of 0.75 Ohm cm$^2$ indicating corrosion resistive behavior of the NCM coatings on the SS316 plates.

It will be appreciated that while a particular sequence of steps has been shown and described for purposes of explanation, the sequence may be varied in certain respects, or the steps may be combined, while still obtaining the desired configuration. Additionally, modifications to the disclosed embodiment and the invention as claimed are possible and within the scope of this disclosed invention.

The invention claimed is:

1. A method of depositing a carbon layer, comprising:
   applying a layer of nanostructured carbon material (NCM) to a substrate from a polymer-free dispersion of NCM in a carrier liquid;
   heating the layer of NCM in an atmosphere comprising 1 to 100 volume percentage of inert gas with the remaining portion of said atmosphere comprising oxidizing gas by volume to form a polymer-free NCM coating; wherein the heating is carried out in the range of about 100 to 700° C.

2. The method of claim 1, wherein the NCM is selected from the group consisting of single-walled carbon nanotubes, multi-walled carbon nanotubes, double-walled carbon nanotubes, structureless amorphous carbon, exfoliated graphite sheets, graphene and a combination thereof.

3. The method of claim 1, wherein the dispersion of NCM comprises between 1 mg/L to 10 g/L NCM.

4. The method of claim 1, wherein a preselected NCM coverage of the substrate is obtained by controlling the volume of NCM dispersion applied or duration of application of the NCM dispersion.

5. The method of claim 1, further comprising:
   electrochemical cycling of the NCM coated substrate through a chosen voltage range in an acid or base solution.

6. The method of claim 1, wherein the NCM dispersion further comprises a thickening agent.

7. The method of claim 1, wherein the substrate comprises a flow plate for use in a fuel cell.

8. A method of depositing a carbon layer, comprising:
applying a layer of nanostructured carbon material (NCM) to a substrate from a dispersion of NCM in a carrier liquid to form a layer of NCM; and
heating the layer of NCM in an atmosphere comprising 1 to 100 volume percentage of inert gas with the remaining portion of said atmosphere comprising oxidizing gas by volume to form a NCM coating on the surface of the substrate; wherein the heating is carried out in the range of about 100 to 700° C.;
wherein the NCM coating comprises aspected carbon particles oriented substantially parallel to the surface of the substrate.

9. The method of claim 8, wherein the aspected carbon particles are selected from the group consisting of single-walled carbon nanotubes, multiwalled carbon nanotubes, double-walled carbon nanotubes, and a combination thereof.

10. The method of claim 8, further comprising applying a carbon forming polymer to the substrate, wherein the carbon-forming polymer is applied from a solution or a dispersion.

11. The method of claim 10, wherein the dispersion of NCM material comprises the carbon forming polymer.

12. The method of claim 8, wherein the dispersion of NCM comprises between 1 mg/L to 10 g/L NCM.

13. The method of claim 8, wherein a preselected NCM coverage of the substrate is obtained by controlling the volume of NCM dispersion applied or duration of application of the NCM dispersion.

14. The method of claim 8, further comprising:
electrochemically cycling the NCM coating coated substrate through a chosen voltage range in an acid or base solution.

15. The method of claim 8, wherein the NCM dispersion further comprises a surfactant.

16. The method of claim 8, wherein the NCM dispersion further comprises a thickening agent.

17. The method of claim 8, wherein the substrate comprises a flow plate for use in a fuel cell.

* * * * *